(No Model.)
H. H. McELHINEY.
CASTER SOCKET.
No. 498,444. Patented May 30, 1893.
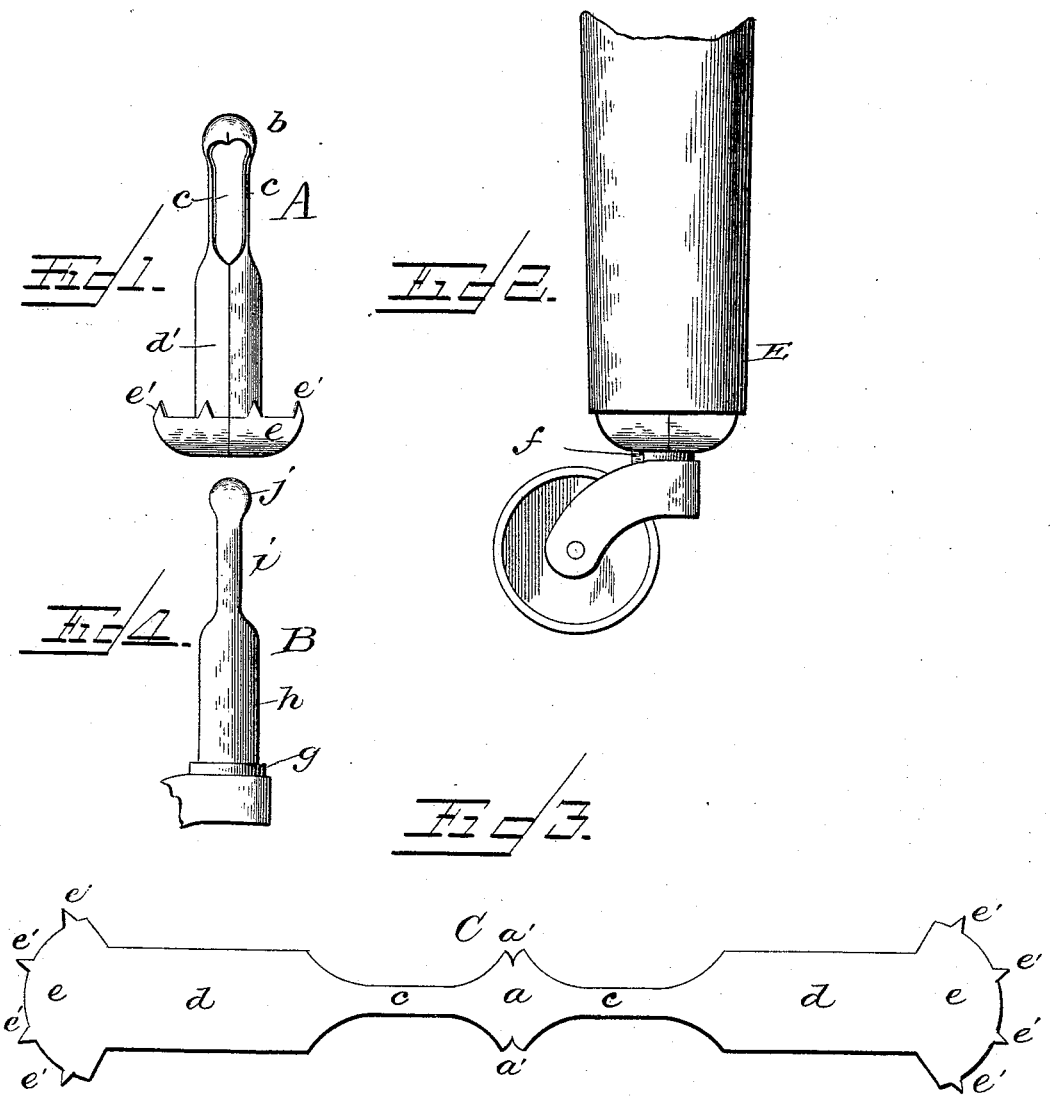
WITNESSES
M. E. Lansdale
F. J. Duffie
INVENTOR
H. H. McElhiney
By John S. Duffie
Attorney
THE NORRIS PETERS CO., PHOTO-LITHO., WASHINGTON, D. C.

UNITED STATES PATENT OFFICE.

HARRISON H. McELHINEY, OF NEBRASKA CITY, NEBRASKA, ASSIGNOR TO THE McELHINEY MANUFACTURING COMPANY, OF SAME PLACE.

CASTER-SOCKET.

SPECIFICATION forming part of Letters Patent No. 498,444, dated May 30, 1893.

Application filed April 21, 1892. Serial No. 430,081. (No model.)

*To all whom it may concern:*

Be it known that I, HARRISON H. McELHINEY, a citizen of the United States, residing at Nebraska City, in the county of Otoe and State of Nebraska, have invented certain new and useful Improvements in Caster-Sockets; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to casters and caster sockets and consists in the novel construction and arrangement of its parts.

In the accompanying drawings: Figure 1, is an elevation of my socket. Fig. 2, is the lower end of a foot with my socket and a caster shank inserted therein. Fig. 3, is the blank out of which my socket is forged. Fig. 4, is the shank of a caster adapted to fit my socket.

The object of my invention is to produce a socket that will fit in the foot of a piece of furniture in such a manner that it will not turn in its place and is provided with springs to admit and hold in the upper end of a caster a shank, and while allowing the shank to turn freely prevents the same from falling out while the furniture is being moved from place to place, its springs however being sufficiently elastic to allow the shank to be withdrawn, also furnishing a base for the shoulder of the shank or a wheel on the shank to run against.

In the accompanying drawings: A, represents the socket; B, the caster shank; C, the blank out of which the socket is forged, and E, the foot of a piece of furniture with my socket and caster inserted therein. The blank is doubled in the middle of the center piece, $a$, having the side notches, $a'$, and this part is pressed until it forms a hollow half globe, $b$. The parts, $c, c$, are pressed in so that their outer surfaces will not be flush with the outer face of the half globe, thus allowing them to spring so that the head of the shank may be passed up into the half globe, $b$ or withdrawn therefrom. The parts, $d$, are pressed into half cylinders so that when they come together they form a cylindrical body, $d'$, the diameter of which is considerably greater than the distance between the springs, $c, c$. The parts, $e$, of the blank having the teeth, $e'$, are turned out to form a base for a wheel, $f$, or a shoulder, $g$, to run against. The outer edges of said parts, $e$, and the teeth are turned up so that the said teeth may enter the foot, E. The shank, B, is provided with a shoulder, $g$, or a wheel, $f$, to run against the base, $e$, of the socket, a neck, $i$, to work between the springs, $c, c$, and a head, $j$, to fit in the hollow of the half globe, $b$, and has a body, $h$, which fits into the body, $d'$, of the socket.

Having described my invention, what I claim as new, and desire to secure by Letters Patent, is—

1. The socket A, consisting of the hollow half globe $b$, adapted to hold the globular head $j$, of a caster B, cylindrical body $d'$, side springs $c$, bent inwardly and of sufficient elasticity to yield and allow the globular head $j$, to pass up into the half globe, and to be withdrawn; their upper ends being integral with the lower edge of said half globe, and their lower ends integral with the upper end of the said body, substantially as shown and described and for the purposes set forth.

2. The combination of the socket A, consisting of the hollow half globe $b$, adapted to hold the globular head $j$, of a caster B, cylindrical body $d'$, side springs $c$, bent inwardly and of sufficient elasticity to yield and allow the globular head $j$, to pass up into the half globe, and to be withdrawn; their upper ends being integral with the lower edge of said half globe, and their lower ends integral with the upper end of the said body, with the caster B, having the globular head $j$, adapted to fit in the hollow half-globe $b$; neck $i$, adapted to work between the springs $c$, and body $h$, adapted to fit and turn in the body $d'$, of the socket, substantially as shown and described and for the purposes set forth.

In testimony whereof I affix my signature in presence of two witnesses.

HARRISON H. McELHINEY.

Witnesses:
FRANK P. IRLAND,
HOWBERT BILLMAN.